United States Patent
Burkhart et al.

(10) Patent No.: US 12,240,124 B2
(45) Date of Patent: Mar. 4, 2025

(54) MOVING ALONG A PREDETERMINED PATH WITH A ROBOT

(71) Applicant: KUKA Deutschland GmbH, Augsburg (DE)

(72) Inventors: Stefan Burkhart, Dillingen (DE); Andreas Hagenauer, Friedberg (DE); Manfred Huettenhofer, Meitingen (DE); Robert Schreittmiller, Statzling (DE)

(73) Assignee: KUKA Deutschland GmbH (DE)

( * ) Notice: Subject to any disclaimer, the term of this patent is extended or adjusted under 35 U.S.C. 154(b) by 887 days.

(21) Appl. No.: 15/739,548

(22) PCT Filed: Jun. 20, 2016

(86) PCT No.: PCT/EP2016/001050
§ 371 (c)(1),
(2) Date: Dec. 22, 2017

(87) PCT Pub. No.: WO2016/206798
PCT Pub. Date: Dec. 29, 2016

(65) Prior Publication Data
US 2018/0178383 A1  Jun. 28, 2018

(30) Foreign Application Priority Data
Jun. 25, 2015 (DE) .................. 10 2015 008 188.8

(51) Int. Cl.
*B25J 9/16* (2006.01)
*G05B 19/042* (2006.01)

(52) U.S. Cl.
CPC .......... *B25J 9/1666* (2013.01); *B25J 9/1664* (2013.01); *B25J 9/1669* (2013.01); *G05B 19/042* (2013.01);
(Continued)

(58) Field of Classification Search
CPC ........ B25J 9/163; B25J 9/1664; B25J 9/1669; B25J 9/1674; B25J 9/1682;
(Continued)

(56) References Cited

U.S. PATENT DOCUMENTS 4,433,382 A * 2/1984 Cunningham ..... G05B 19/4083
700/192
4,568,816 A * 2/1986 Casler, Jr. .......... G05B 19/4083
901/42
(Continued)

FOREIGN PATENT DOCUMENTS

| CN | 1507384 A | 6/2004 |
| CN | 1990197 A | 7/2007 |

(Continued)

OTHER PUBLICATIONS

European Patent Office; Search Report in International Patent Application No. PCT/EP2016/001050 published Dec. 29, 2016; 10 pages.

(Continued)

*Primary Examiner* — Bhavesh V Amin
(74) *Attorney, Agent, or Firm* — Dorton & Willis, LLP (57) ABSTRACT

A method for moving along a predetermined path with a robot in an at least a partially automated manner includes determining a deployment position on a current path section of the predetermined path for which a distance parameter satisfies a predetermined condition, and moving to the deployment position with the robot. In one aspect, the robot may be moved to the deployment position if a deployment condition is satisfied. The distance parameter may be determined on the basis of a distance of a current position of the robot relative to the current path section. The predetermined condition may be that the distance parameter has a value that is less than or equal to the values of the distance parameter of all positions in a partial area of the current path section, (Continued)

which is in particular complementary to the deployment position.

19 Claims, 2 Drawing Sheets (52) U.S. Cl.
 CPC .............. *G05B 2219/36043* (2013.01); *G05B 2219/39219* (2013.01); *G05B 2219/39433* (2013.01); *G05B 2219/40371* (2013.01); *G05B 2219/40519* (2013.01); *G05B 2219/40521* (2013.01); *Y10S 901/02* (2013.01); *Y10S 901/49* (2013.01)

(58) Field of Classification Search
 CPC ........... G05B 2219/39109; G05B 2219/40307; G05B 2219/40521; G05B 2219/50109; Y10S 901/08
 See application file for complete search history.

(56) References Cited

U.S. PATENT DOCUMENTS

| | | | | |
|---|---|---|---|---|
| 4,617,502 A * | 10/1986 | Sakaue | ................. | G05B 19/42 318/636 |
| 4,675,502 A * | 6/1987 | Haefner | ................. | B25J 9/1684 901/3 |
| 4,733,040 A * | 3/1988 | Pelloni | .................... | B23H 7/16 219/69.19 |
| 5,084,826 A * | 1/1992 | Hariki | .............. | G05B 19/41815 901/6 |
| 5,086,262 A * | 2/1992 | Hariki | .................... | B25J 9/1682 318/568.1 |
| 5,243,266 A * | 9/1993 | Kasagami | .............. | B25J 9/1682 700/12 |
| 5,254,923 A * | 10/1993 | Kanitani | .................. | B25J 9/009 901/1 |
| 5,467,003 A * | 11/1995 | Kosaka | .................. | B25J 9/1684 318/572 |
| 5,530,791 A * | 6/1996 | Okabayashi | ........... | B25J 9/1666 700/255 |
| 5,545,960 A * | 8/1996 | Ishikawa | .............. | G05D 1/0255 318/587 |
| 5,758,298 A * | 5/1998 | Guldner | ................. | G01S 15/931 701/25 |
| 5,815,399 A * | 9/1998 | Fujibayashi | ....... | G05B 19/4141 700/181 |
| 5,889,924 A * | 3/1999 | Okabayashi | ........... | B25J 9/1682 700/245 |
| 6,004,016 A * | 12/1999 | Spector | .................. | B25J 9/1666 700/255 |
| 6,004,019 A * | 12/1999 | Suita | .................... | B23K 11/252 700/212 |
| 6,040,554 A * | 3/2000 | Terada | ................. | B23K 9/1274 901/42 |
| 6,134,486 A * | 10/2000 | Kanayama | ........... | G05D 1/0212 701/25 |
| 6,303,890 B1 * | 10/2001 | Scuderi | .................. | G05B 19/19 219/69.16 |
| 6,330,493 B1 * | 12/2001 | Takahashi | .............. | B25J 9/1682 700/250 |
| 6,374,155 B1 * | 4/2002 | Wallach | ............... | G05D 1/0295 701/25 |
| 6,442,451 B1 * | 8/2002 | Lapham | ................. | B25J 9/1656 901/8 |
| 6,489,741 B1 * | 12/2002 | Genov | .................... | B25J 9/163 318/566 |
| 6,556,891 B2 * | 4/2003 | Hietmann | .............. | B25J 9/1602 901/3 |
| 6,748,325 B1 * | 6/2004 | Fujisaki | ............... | G08G 5/0056 701/301 |
| 6,804,580 B1 * | 10/2004 | Stoddard | ................ | B25J 9/1669 318/568.13 |
| 6,897,626 B2 * | 5/2005 | Fujibayashi | ....... | G05B 19/4103 318/567 |
| 7,010,390 B2 * | 3/2006 | Graf | ...................... | B25J 9/1682 901/6 |
| 7,024,250 B2 * | 4/2006 | Graf | ................. | G05B 19/41825 901/6 |
| 7,069,112 B2 * | 6/2006 | Graf | ...................... | B25J 9/1682 700/254 |
| 7,076,322 B2 * | 7/2006 | Chandhoke | .......... | G05B 19/416 700/180 |
| 7,085,624 B2 * | 8/2006 | Aldred | ................ | G05D 1/0255 700/254 |
| 7,110,859 B2 * | 9/2006 | Shibata | ................... | B23K 11/11 901/14 |
| 7,130,718 B2 * | 10/2006 | Gunnarsson | ........... | B25J 9/1641 700/250 |
| 7,149,606 B2 * | 12/2006 | Krause | ............... | G05B 19/0421 318/705 |
| 7,174,474 B1 * | 2/2007 | Low | ..................... | H04J 3/0664 713/400 |
| 7,209,801 B2 * | 4/2007 | Anfindsen | ............ | G05B 19/425 700/264 |
| 7,211,978 B2 * | 5/2007 | Chang | ................... | B25J 9/1669 901/41 |
| 7,251,548 B2 * | 7/2007 | Herz | ................... | A01D 34/008 701/25 |
| 7,395,606 B2 * | 7/2008 | Crampton | ............. | G01B 5/008 33/503 |
| 7,421,314 B2 * | 9/2008 | Stoddard | ................ | B25J 9/1682 318/568.13 |
| 7,443,124 B2 * | 10/2008 | Bischoff | ................ | B25J 9/1674 318/568.17 |
| 7,558,646 B2 * | 7/2009 | Matsumoto | ............ | B25J 9/1682 700/229 |
| 7,620,478 B2 * | 11/2009 | Fortell | ............ | G05B 19/41815 700/169 |
| 7,627,394 B2 * | 12/2009 | Volcic | .................... | B25J 9/1664 318/567 |
| 7,653,977 B2 * | 2/2010 | Wiedemann | .......... | B23P 21/008 29/709 |
| 7,680,547 B2 * | 3/2010 | Liu | ....................... | G05B 13/024 700/19 |
| 7,729,804 B2 * | 6/2010 | Matsumoto | ...... | G05B 19/41815 700/19 |
| 7,860,609 B2 * | 12/2010 | Yanagita | ................ | B25J 9/1682 709/248 |
| 7,865,277 B1 * | 1/2011 | Larson | ................. | G05D 1/0206 114/221 A |
| 7,957,838 B2 * | 6/2011 | Poljen | ................... | B25J 13/065 318/568.14 |
| 7,974,737 B2 * | 7/2011 | Tilove | ................. | B25J 9/1666 700/255 |
| 8,185,265 B2 * | 5/2012 | Nagano | ................. | B25J 9/1666 701/25 |
| 8,204,623 B1 * | 6/2012 | Bhattacharyya | ....... | B25J 9/1666 700/1 |
| 8,239,083 B2 * | 8/2012 | Durkos | ................ | G05D 1/0219 701/25 |
| 8,271,131 B2 * | 9/2012 | Kato | ................... | G05B 19/404 700/246 |
| 8,290,620 B2 * | 10/2012 | Yoshizawa | ............ | B25J 9/1664 700/252 |
| 8,340,820 B2 * | 12/2012 | Nair | ....................... | B25J 9/1666 700/255 |
| 8,386,110 B2 * | 2/2013 | Maekawa | ............ | G05D 1/0217 701/425 |
| 8,392,065 B2 * | 3/2013 | Tolstedt | ............... | G05D 1/0214 701/41 |
| 8,588,981 B2 * | 11/2013 | Fortell | ................... | B25J 9/1682 700/250 |
| 8,639,364 B2 * | 1/2014 | Stoddard | ................ | B25J 9/1669 700/14 |
| 8,930,009 B2 * | 1/2015 | Miyoshi | ................. | B25J 9/1679 438/694 |

(56) References Cited

U.S. PATENT DOCUMENTS

| | | | | |
|---|---|---|---|---|
| 8,972,061 B2* | 3/2015 | Rosenstein | A47L 11/4061 | |
| | | | 901/1 | |
| 9,102,060 B2* | 8/2015 | Tarragona | G05B 19/0426 | |
| 9,192,869 B2* | 11/2015 | Moriya | A63H 17/00 | |
| 9,354,626 B2* | 5/2016 | Boerner | B25J 9/1679 | |
| 9,381,645 B1* | 7/2016 | Yarlagadda | G05B 19/42 | |
| 9,408,515 B2* | 8/2016 | Rosenstein | A47L 9/2826 | |
| 9,411,335 B2* | 8/2016 | Kim | G05D 1/0217 | |
| 9,573,273 B2* | 2/2017 | Takeda | G06N 20/00 | |
| 9,632,493 B2* | 4/2017 | Negre | G05B 19/0426 | |
| 9,821,456 B2* | 11/2017 | Riedel | B25J 15/00 | |
| 9,895,807 B2* | 2/2018 | Wiedemann | B25J 9/1682 | |
| 9,943,964 B2* | 4/2018 | Hares | A61B 34/32 | |
| 10,179,406 B2* | 1/2019 | Dalibard | B25J 9/1697 | |
| 10,239,206 B2* | 3/2019 | Negishi | B25J 9/1638 | |
| 10,394,216 B2* | 8/2019 | Krause | G05B 19/0426 | |
| 10,426,560 B2* | 10/2019 | Bowling | A61B 34/30 | |
| 10,780,582 B2* | 9/2020 | Pinter | G16H 40/67 | |
| 10,836,038 B2* | 11/2020 | Sun | G05B 19/404 | |
| 11,065,766 B2* | 7/2021 | Sedlmayr | B25J 9/1674 | |
| 11,110,605 B2* | 9/2021 | Zanchettin | B25J 9/1682 | |
| 11,169,523 B2* | 11/2021 | Oh | G01V 11/00 | |
| 12,042,805 B2* | 7/2024 | Kunz | B05B 12/122 | |
| 2003/0025472 A1* | 2/2003 | Jones | G05D 1/0272 | |
| | | | 318/568.12 | |
| 2003/0216834 A1* | 11/2003 | Allard | B25J 9/1689 | |
| | | | 700/245 | |
| 2003/0220715 A1* | 11/2003 | Kneifel, II | G05B 19/41815 | |
| | | | 700/248 | |
| 2004/0030452 A1* | 2/2004 | Graf | B25J 9/1682 | |
| | | | 700/245 | |
| 2004/0030453 A1* | 2/2004 | Graf | B25J 9/1682 | |
| | | | 700/245 | |
| 2004/0093119 A1* | 5/2004 | Gunnarsson | B25J 9/1638 | |
| | | | 700/245 | |
| 2004/0111185 A1* | 6/2004 | Gmeiner | B23K 26/0884 | |
| | | | 700/262 | |
| 2004/0135779 A1 | 7/2004 | Inukai | | |
| 2004/0138779 A1* | 7/2004 | Shibata | B25J 9/1666 | |
| | | | 700/264 | |
| 2004/0172164 A1* | 9/2004 | Habibi | G06T 1/0007 | |
| | | | 700/245 | |
| 2004/0193321 A1* | 9/2004 | Anfindsen | G05B 19/425 | |
| | | | 700/264 | |
| 2004/0199290 A1* | 10/2004 | Stoddard | B25J 9/1669 | |
| | | | 700/248 | |
| 2004/0230340 A1* | 11/2004 | Fukuchi | G05D 1/027 | |
| | | | 318/568.12 | |
| 2004/0254677 A1* | 12/2004 | Brogardh | G05B 19/4083 | |
| | | | 700/250 | |
| 2005/0107921 A1* | 5/2005 | Watanabe | G05B 19/425 | |
| | | | 700/253 | |
| 2005/0131581 A1* | 6/2005 | Sabe | G06V 20/64 | |
| | | | 700/245 | |
| 2005/0165508 A1* | 7/2005 | Kanda | G05D 1/0285 | |
| | | | 700/258 | |
| 2006/0149421 A1* | 7/2006 | Akiyama | B25J 9/1664 | |
| | | | 700/245 | |
| 2006/0200254 A1* | 9/2006 | Krause | G05B 19/0421 | |
| | | | 700/20 | |
| 2006/0217841 A1* | 9/2006 | Matsumoto | G05B 19/41815 | |
| | | | 700/248 | |
| 2007/0019029 A1* | 1/2007 | Hiruma | B41J 2/16511 | |
| | | | 347/29 | |
| 2007/0030271 A1 | 2/2007 | Kamiya | | |
| 2007/0142967 A1* | 6/2007 | Volcic | B25J 9/1674 | |
| | | | 700/245 | |
| 2008/0009964 A1* | 1/2008 | Bruemmer | G06N 3/008 | |
| | | | 700/245 | |
| 2008/0009965 A1* | 1/2008 | Bruemmer | G06N 3/008 | |
| | | | 701/23 | |
| 2008/0009966 A1* | 1/2008 | Bruemmer | G05D 1/0274 | |
| | | | 700/245 | |
| 2008/0009967 A1* | 1/2008 | Bruemmer | G05D 1/0088 | |
| | | | 700/245 | |
| 2008/0009968 A1* | 1/2008 | Bruemmer | G06N 3/008 | |
| | | | 700/245 | |
| 2008/0009969 A1* | 1/2008 | Bruemmer | G06N 3/008 | |
| | | | 700/245 | |
| 2008/0009970 A1* | 1/2008 | Bruemmer | G05D 1/0088 | |
| | | | 700/245 | |
| 2008/0114492 A1* | 5/2008 | Miegel | B25J 9/1664 | |
| | | | 901/6 | |
| 2008/0154457 A1* | 6/2008 | Yu | G05D 1/027 | |
| | | | 701/26 | |
| 2009/0018690 A1* | 1/2009 | Negre | G05B 19/0426 | |
| | | | 901/42 | |
| 2009/0198378 A1* | 8/2009 | Boerner | G05B 19/4067 | |
| | | | 700/250 | |
| 2009/0228166 A1* | 9/2009 | Durkos | G05D 1/0246 | |
| | | | 701/26 | |
| 2009/0234527 A1* | 9/2009 | Ichinose | G05D 1/0272 | |
| | | | 701/23 | |
| 2009/0326713 A1* | 12/2009 | Moriya | B25J 9/1676 | |
| | | | 701/25 | |
| 2010/0008754 A1* | 1/2010 | Hartmann | G05B 19/4103 | |
| | | | 700/250 | |
| 2010/0063663 A1* | 3/2010 | Tolstedt | G05D 1/0231 | |
| | | | 701/41 | |
| 2010/0063680 A1* | 3/2010 | Tolstedt | G05D 1/0214 | |
| | | | 701/1 | |
| 2010/0094481 A1* | 4/2010 | Anderson | A01D 34/008 | |
| | | | 701/1 | |
| 2010/0152944 A1* | 6/2010 | Kouno | G05D 1/0244 | |
| | | | 700/259 | |
| 2010/0198402 A1* | 8/2010 | Greer | B25J 3/04 | |
| | | | 901/41 | |
| 2010/0235033 A1* | 9/2010 | Yamamoto | G05D 1/024 | |
| | | | 701/26 | |
| 2010/0241289 A1* | 9/2010 | Sandberg | G06T 1/0014 | |
| | | | 701/2 | |
| 2011/0009238 A1* | 1/2011 | Baba | B61B 10/04 | |
| | | | 477/185 | |
| 2011/0035087 A1* | 2/2011 | Kim | G05D 1/0217 | |
| | | | 701/25 | |
| 2011/0054689 A1* | 3/2011 | Nielsen | G05D 1/0088 | |
| | | | 700/258 | |
| 2011/0125324 A1* | 5/2011 | Baek | G05D 1/0219 | |
| | | | 700/258 | |
| 2011/0153080 A1* | 6/2011 | Shapiro | B25J 9/1666 | |
| | | | 700/255 | |
| 2011/0226282 A1* | 9/2011 | Choi | G05D 1/0219 | |
| | | | 134/18 | |
| 2011/0288667 A1* | 11/2011 | Noda | G05B 19/42 | |
| | | | 700/98 | |
| 2012/0165982 A1* | 6/2012 | Kim | B25J 9/162 | |
| | | | 700/262 | |
| 2012/0185089 A1* | 7/2012 | Schreiber | B25J 9/1656 | |
| | | | 700/250 | |
| 2012/0209428 A1* | 8/2012 | Mizutani | G05B 19/423 | |
| | | | 700/250 | |
| 2012/0215351 A1* | 8/2012 | McGee | B25J 9/1676 | |
| | | | 700/248 | |
| 2012/0215352 A1* | 8/2012 | Eberst | B25J 9/1664 | |
| | | | 700/253 | |
| 2012/0232738 A1* | 9/2012 | Jeon | G05D 1/0219 | |
| | | | 701/25 | |
| 2012/0313779 A1* | 12/2012 | Papaefstathiou | | |
| | | | G08B 13/19684 | |
| | | | 701/25 | |
| 2013/0116880 A1* | 5/2013 | Shitamoto | G05D 1/0236 | |
| | | | 701/25 | |
| 2013/0238170 A1* | 9/2013 | Klinger | G05D 1/104 | |
| | | | 701/25 | |
| 2013/0345867 A1* | 12/2013 | Wiedemann | B25J 9/1669 | |
| | | | 700/252 | |
| 2014/0124004 A1* | 5/2014 | Rosenstein | G05D 1/0219 | |
| | | | 15/3 | |
| 2015/0073593 A1 | 3/2015 | Hamm et al. | | |

(56) References Cited

U.S. PATENT DOCUMENTS

| | | | | |
|---|---|---|---|---|
| 2015/0148958 A1* | 5/2015 | Primessnig | ............ | B25J 9/1676 |
| | | | | 700/255 |
| 2015/0239121 A1* | 8/2015 | Takeda | ..................... | G06N 7/00 |
| | | | | 700/250 |
| 2015/0239123 A1 | 8/2015 | Hagenauer et al. | | |
| 2015/0277398 A1* | 10/2015 | Madvil | .................. | G05B 13/04 |
| | | | | 901/3 |
| 2015/0278406 A1* | 10/2015 | Embon | .................. | B25J 9/1671 |
| | | | | 703/13 |
| 2015/0321349 A1* | 11/2015 | Hazan | .................... | B23Q 3/155 |
| | | | | 901/41 |
| 2015/0336267 A1* | 11/2015 | Sun | .......................... | B25J 9/163 |
| | | | | 901/41 |
| 2016/0031082 A1* | 2/2016 | Hazan | .................... | B25J 9/1664 |
| | | | | 700/250 |
| 2016/0031083 A1* | 2/2016 | Embon | .................. | B25J 9/1666 |
| | | | | 901/49 |
| 2016/0034613 A1* | 2/2016 | Hazan | .................... | B25J 9/1664 |
| | | | | 703/13 |
| 2016/0167652 A1* | 6/2016 | Slusar | .................. | B60W 30/09 |
| | | | | 701/27 |
| 2017/0028556 A1* | 2/2017 | Summer | ................ | B25J 9/1664 |
| 2017/0036232 A1* | 2/2017 | Hoffman | ............ | B05B 13/0431 |
| 2017/0080565 A1* | 3/2017 | Dalibard | .............. | G05D 1/0214 |
| 2017/0199525 A1* | 7/2017 | Albaghajati | ......... | G05D 1/0274 |
| 2017/0245955 A1* | 8/2017 | Bowling | ................ | A61B 34/20 |
| 2017/0347979 A1* | 12/2017 | Fehre | .................. | G06F 30/13 |
| 2018/0178383 A1* | 6/2018 | Burkhart | ................ | B25J 9/1666 |
| 2018/0281191 A1* | 10/2018 | Sinyavskiy | .......... | G05D 1/0214 |
| 2019/0184571 A1* | 6/2019 | Hou | .......................... | A47L 1/00 |
| 2019/0202055 A1* | 7/2019 | Wang | .................... | B25J 9/1697 |
| 2019/0210224 A1* | 7/2019 | Zanchettin | ............ | B25J 9/1664 |
| 2019/0263393 A1* | 8/2019 | Han | ..................... | G05D 1/0055 |
| 2021/0129999 A1* | 5/2021 | Tsaliah | .................... | G05D 1/106 |
| 2021/0252707 A1* | 8/2021 | Wang | .................... | B25J 9/1666 |
| 2023/0356399 A1* | 11/2023 | So | ........................ | A47L 11/4069 |
| 2023/0384444 A1* | 11/2023 | Yaguma | ................... | G01S 3/043 |
| 2024/0319745 A1* | 9/2024 | Tsaliah | .................... | B64U 30/29 |

FOREIGN PATENT DOCUMENTS

| | | |
|---|---|---|
| CN | 103433925 A | 12/2013 |
| CN | 103513656 A | 1/2014 |
| CN | 104423318 A | 3/2015 |
| CN | 104684695 A | 6/2015 |
| DE | 3711020 A1 | 10/1988 |
| DE | 102008007438 B4 | 11/2012 |
| EP | 0425959 A2 | 5/1991 |
| EP | 0696493 A1 | 2/1996 |
| EP | 0696493 B1 | 9/1998 |
| WO | 2014019706 A1 | 2/2014 |
| WO | 2014135175 A1 | 9/2014 |

OTHER PUBLICATIONS

German Patent Office; Office Action in related German Patent Application No. 10 2015 008 188.8 dated Oct. 22, 2015; 4 pages.

Chinese Patent Office; Office Action in related Chinese Patent Application No. 201680037192.0 dated Apr. 2, 2020; 7 pages.

Chinese Patent Office; Search Report in related Chinese Patent Application No. 201680037192.0 dated Mar. 28, 2020; 3 pages.

European Patent Office; Office Action in related European Patent Application No. 16 731 512.6 dated Jun. 8, 2021; 5 pages.

European Patent Office; Office Action in related European Patent Application No. 16 731 512.6 dated Jun. 15, 2023; 7 pages.

* cited by examiner

MOVING ALONG A PREDETERMINED PATH WITH A ROBOT

CROSS-REFERENCE

This application is a national phase application under 35 U.S.C. § 371 of International Patent Application No. PCT/EP2016/001050, filed Jun. 20, 2016 (pending), which claims the benefit of German Patent Application No. DE 10 2015 008 188.8 filed Jun. 25, 2015, the disclosures of which are incorporated by reference herein in their entirety.

TECHNICAL FIELD

The present invention relates to a method for the at least partially automated movement along a predetermined path by a robot, in particular the at least partially automated synchronous movement along a predetermined group of paths with at least two robots, a system and a computer program product for performing the method, as well as a robot setup with the system.

BACKGROUND

According to in-house practice, robots are moved along predetermined paths, whereby the robots are moved sequentially along predefined sections of the path, which, for example, can be defined by linear, circular or spline movements, whereby the end position of a preceding path section can form the starting position of the subsequent path section. A path section can be specified by the instruction set of a control program, whereby a set pointer successively chooses instruction sets whose corresponding path sections are then traversed as the respectively current path section.

If, particularly after an interruption while traversing the path, the robot is no longer located on the respective current path as selected by the set pointer, for example because after the interruption the robot was manually moved, or the path section was manually changed or the set pointer manually selected a different one of the stored path sections, the robot must (again) be positioned on the (possibly new) current section of the path, before movement along the path or rather the current path section can be performed or continued.

In this case, according to in-house practice, hitherto the robot was moved to the end position of the current path section along a linear path, which is also referred to as a so-called set-coincidence (SAK) movement.

However, if the end position is far away from the current position of the robot, this can cause extended travels offside of the predetermined path, which may not be known in advance and which may be disadvantageous compared with the travels along a predefined, particularly an optimized and/or collision-free planned path.

SUMMARY

The function of the present invention is to improve the movement of robots along paths.

This problem is solved by a method for moving along a predetermined path with a robot with features as described herein.

According to one aspect of the present invention, a method for the at least partially automated movement along a predefined, in particular a stored, path with/by a robot includes the following steps:

Determining a deployment position on a current path section of the predetermined path, for which a distance parameter, which is defined or rather determined on the basis of a distance of a current position of the robot relative to the current path section, satisfies a predetermined condition, in particular its value being less than or equal to the values of the distance parameter of all positions in a partial area of the current path section, which is in particular complementary to the deployment position; and moving to the deployment position with the robot, in particular, insofar as or rather in dependence of whether a deployment condition is satisfied.

A system for the at least partially automated movement along a predetermined path with/by a robot according to an aspect of the present invention, in particular a system, in particular a controller, a robot setup with one or more robots according to an aspect of the present invention, is set up by hardware means and/or software means to perform one of the methods described herein and/or features:

means to determine a deployment position on a current path section of the predetermined path, for which a distance parameter, which is defined, in particular determined, on the basis of a distance of a current position of the robot relative to the current path section, satisfies a predetermined condition, in particular its value being less than or equal to the values of the distance parameter of all positions in a partial area of the current path section, which is in particular complementary to the deployment position; and means to move to the deployment position with the robot, in particular, insofar as or rather in dependence of whether a deployment condition is satisfied.

The robot or rather at least one of the robots of the robot setup has in an exemplary embodiment at least three, particularly at least six, particularly actuable or motor-actuated joints or axes, particularly swivel joints or rotary axes. In an exemplary embodiment, the robot has a (robot) arm with at least six axes and/or one or more active or actuable and/or passive or rather driveless additional axes to move a robot base relative to the environment.

In an exemplary embodiment, a position of a robot comprises or describes a particular three-dimensional position and/or orientation of a robot-fixed reference, particularly its tool center points, and/or, particularly with redundant robots or singular poses, a unique pose, and/or an axis position or joint position or joint coordinate of one or several or all axes of the robot, particularly one or several or all axes of the arm of the robot and/or additional axes of the robot, in which a base of the arm, particularly actuable or actuated, particularly by motor, is movable. The position can thus be similarly specified in the (Cartesian) workspace or in the joint coordinate space or axis coordinate space of the robot.

Accordingly, components of the particularly multidimensional, particularly at least six-dimensional, position, are in the present case generally referred to as coordinates of the robot; they can comprise, or be, particularly joint coordinates, particularly joint angles, position coordinates, orientation angles such as particularly EULER or CARDAN angles, Denavit-Hartenberg parameters, quaternion fields or the like.

In an exemplary embodiment, one path or rather the predetermined path or rather the stored path comprises one or more predetermined, particularly stored, path sections. In an exemplary embodiment, a path section comprises one or more predetermined, particularly saved, positions of the robot and/or their connection, which in a further development can be or can become linear, ring-shaped or (partially) circular or defined by splines. In one exemplary embodiment, a path section is or rather will be predefined by the instruction set of a control program such as LIN(x), SPLINE $(x_1, x_2, \ldots)$ or similar with positions $x_1, x_2 \in \Re^{DOF}$ in the work space or joint angle space and the number of degrees of freedom DOF of the robot.

In an exemplary embodiment one or rather the current path section is a current or rather the next to be traversed path section of the predetermined path. It, or rather the instruction set that defines it, can particularly be or have been selected by a set pointer, which in a further development automatically selects in succession different path sections or instruction sets, to have the predetermined path traversed by the robot, and/or manually or by operator-command can be or will be placed or switched over on/to a different or any other path section or command set.

In an exemplary embodiment, the distance of a position to a path section can depend on or be described by a particularly Cartesian or Euclidean, particularly minimal or vertical distance of the position to the path section, particularly in the work space or the joint coordinate space. In an exemplary embodiment, the distance is the quantity or rather the Euclidean norm or length of the multi-dimensional vector, particularly in the work space or the joint coordinate space, from the position on the path section, which is perpendicular to the path section.

In an exemplary embodiment, the distance parameter can be a single or multi-dimensional quantity, which depends on the distance, particularly linearly, or (mathematically) describes the distance. In a further development, the distance parameter can have or rather be a particularly weighted norm, particularly a sum of the differences between one or more or all coordinates of the robot and of the path section.

If generally a position of the robot is described by the coordinates $x = [x_1, \ldots, x_n]$ for example the position=$[x_1=x, x_2=Y, x_1=z]$ and the orientation $[x_4=\alpha, x_5=\beta, x_6=\gamma]$ of its TCP or its joint angle $[q_1, \ldots, q_6,]$, and a path section is described correspondingly by a relation, particularly a function, $Y(s)=[Y_1(s), \ldots, Y_n(s)]$ with the path parameter, then the distance or rather the distance parameter d(s) can particularly be defined as $d(s)=\Sigma_i w_i \cdot |x_i - Y_i(s)|$ with the weighting factors $w_i$ or also a different norm, for example a maximum norm, via x, Y, particularly (x-Y) for example $d(s)=Max(w_i \cdot |x_i - Y_i(s)|)$. In one exemplary embodiment, the weighting factors $w_i$ are all unequal to 0, specifically equal to 1, in another exemplary embodiment one or more weighting factors $w_i$ can, with the exception of at least one weighting factor, also be equal to 0.

By identifying a deployment position that satisfies a predetermined condition, a robot may be advantageously positioned on the current path section, more specifically again or for the first time.

In an exemplary embodiment, the distance parameter meets the predetermined condition for a (deployment) position or rather the distance parameter of the (deployment) position (only) insofar as or so far as it or its value is less than or equal to the distance parameter or the value of the distance parameter for all positions in a partial area of the current path section or rather the (values of the) distance parameter(s) of all positions within a partial area of the current path section. In other words, the deployment position can be derived from a position on the current path section, which is at least as close to the current position as or closer than all positions within a partial area of the current path section. In this manner, it is possible to achieve an advantageously short movement to the deployment position. If at least two positions in a partial area of the current path section have the same minimum (values of) the distance parameter(s), then in an exemplary embodiment it is possible to select from these positions that deployment position which meets an additional requirement, particularly a position, which is closest to a beginning or end of the current path section or a stored return position or similar.

In a further development, the partial area of the current path section is complementary to the deployment position, or rather the partial area and the deployment position jointly form the current path section. In other words, in one exemplary embodiment the distance parameter of a (deployment) position satisfies the predetermined 5 conditions (only) if or as long as it is less than or equal to the distance parameter of all other positions of the current path section, particularly if or rather insofar as it is minimal. Accordingly, in an exemplary embodiment the deployment position is determined on the current path section of the predetermined path, for which (the value) of a distance parameter, which is defined on the basis of a distance of the current position of the robot to the current path section, is minimal or rather is set up as the means for determining a deployment position. In this manner, it is possible to advantageously achieve the shortest movement to the deployment position.

In an exemplary embodiment, the deployment condition can comprise a deviation of the current position of the robot from the current path section, specifically it may not be fulfilled, insofar as a deviation of the current position of the robot from the current path section is less than a predetermined, single or multi-dimensional (first) limit value, which in one exemplary embodiment n, at least within the framework of the computational and/or positioning accuracy, can be equal to or greater than zero. In one exemplary embodiment, the deviation can be defined or determined in the same manner as the distance parameter. In other words, the deployment condition in an exemplary embodiment is not fulfilled if the current position is not within the current path section.

In this way, the robot can be moved advantageously out of its current position (further) along the current path section, provided that its current position is already sufficiently close to the current path section, particularly that it lies on the current path section.

Additionally, or alternatively, the deployment condition can, particularly after a (preceding) interruption while traversing the path, comprise a deviation of a stored return position of the robot from the current path section, specifically it may not be fulfilled insofar as a deviation of the return position of the robot from the current path section is less than a predetermined, single or multi-dimensional (second) limit value which in an exemplary embodiment, at least within the framework of the computational and/or positioning accuracy, can be equal to or greater than zero. In other words, the deployment condition in an exemplary embodiment is not fulfilled if the return position is not within the current path section.

In an exemplary embodiment, the deviation can be defined or determined in the same manner as the distance parameter. If the current path section does not (any longer) correspond to the path section on which the stored return position is located or for which it was stored or which exhibits the return position, for example, due to a modification of this path section or a jump to a different stored path section, then in an exemplary embodiment the deviation of the return position from the (new) current path section exceeds the (second) limit value. In other words, the deployment condition is not fulfilled in an exemplary embodiment, if or insofar as the current path section exhibits the stored return position.

In a further development, the return position stored will be, or rather is, a or rather the last position of the robot on the path prior to the interruption.

In this way, the robot can be advantageously moved from its current position to its last stored (return) position on the current path section, and from there can be moved on the current path section, provided that the return position is still sufficiently close to the current section, particularly that it is still located on the current path section.

In an exemplary embodiment, the robot is moved to the return position, particularly along a linear path in the work space or in the joint coordinate space and therefore advantageously on particularly a short path, if or insofar as the deviation of the return position of the robot from the current path section is less than the predetermined (second) limit, particularly (only) if or insofar as the deviation of the current position of the robot from the current path section is not less than the predetermined (first) limit. Similarly, in an exemplary embodiment the system has the means for moving to the return position, particularly on a linear path in the work space or in the joint coordinate space, if or insofar as the deviation of the return position of the robot from the current section is less than the predetermined (second) limit, particularly (only) if or insofar as the deviation of the current position of the robot from the current path section is not less than the predetermined (first) limit value.

In an exemplary embodiment, the current path section will be, or rather is, predetermined by a stored path section of the predetermined path, by means of, particularly manually given or operator commanded, modification or alteration or change, particularly substitution or replacement. In other words, the robot can be advantageously positioned on the deployment position and thus on the current path section if its current and/or return position deviates from the current path section due to a modification of the current path section.

In an exemplary embodiment, the current path section will be, or rather is, predefined by a particularly manually or operator commanded jump to a stored path section of the predetermined path. In other words, the robot can be positioned advantageously on the deployment position and thus on the (new) current path section if its current and/or return position deviates from the (previous) current position due to a jump particularly by the set pointer to another path section or instruction set.

In an exemplary embodiment, the current path section can also be a first path section of the predetermined path. In other words, the method can also be used before commencing movement, particularly the first movement or a restarted movement along the predetermined path.

In an exemplary embodiment, the robot is moved to the deployment position along a linear path in the work space or the joint coordinate space and thus advantageously on a particularly short path. Correspondingly, in an exemplary embodiment the system has the means for moving to the deployment position along a linear path in the work space or joint coordinate space.

In an exemplary embodiment, the robot is moved to the deployment position and/or the robot is driven from the deployment position to an end position or target position of the current path section on the current path section, particularly (only after) when it receives a corresponding start command. Correspondingly, in an exemplary embodiment the system has the means to enter a start command and/or means to drive the robot to the deployment position and/or an end position or target position of the current path section on the path section, particularly (only) after an appropriate start command has been given. In this way, in an exemplary embodiment, after reaching the deployment position, which can particularly be accomplished along the shortest way, it is then possible to continue moving on the predetermined path so that it can be used or utilized advantageously as much as possible.

According to one aspect of the present invention, a predetermined first path of a predetermined path group is traversed with/by a first robot of a, or rather the, robot setup in accordance with one of the methods described here, in particular with at least the deployment conditions being fulfilled the robot is moved to the deployment position, and, particularly temporally, in synchronization with this predetermined path, one or more predetermined paths of the path group is traversed with/by one or several other robots(s) of the robot setup.

A system for the at least partially automated movement along a predetermined path group with/by at least two robots according to an aspect of the present invention, particularly a system, particularly a controller, the robot arrangement, is set up by hardware means and/or software means to perform one of the methods described herein and/or has:

A system described here for the at least partially automated movement along a predetermined path with an initial one of the robots; and means for synchronously moving along one or more additional predetermined paths of the path group with one or more other robots of the robot setup.

A synchronized movement along paths is here understood to mean particularly that at least no robot overdrives a predetermined synchronization position on its predetermined path until the robot or the other robots of the robot setup have reached the synchronization positions on their predetermined path assigned to this synchronization position or synchronized with them, particularly a movement along the paths in such a way that the robots, at least essentially, in particular—within the framework of the precision of the robot or the robots—exactly simultaneously reach the synchronization positions assigned to them on their predetermined paths. This can be realized particularly by means of a corresponding Predefined speed profile—(s) with the time derivative $$\frac{ds}{dt}$$

(s) of the path parameter s or a geometric coupling of the paths.

In an exemplary embodiment, one or several of the other robots can wait respectively at a predetermined synchronization position, for example, an end position of a path section, until the first robot reaches on the first path the synchronization position assigned to this or these synchronization position(s) after it has moved to the deployment position.

While doing so, however, it can happen that the first robot does not (any longer) reach this assigned synchronization position, for example, because this synchronization position is located on a skipped or an altered path section.

In particular therefore, in an exemplary embodiment n, synchronized (respectively) to the deployment position of the first robot, a further deployment position of the first robot or the other robots on the path or paths is determined and stopped at by the robot or the robots. A synchronized further deployment position can particularly be determined or defined in such a way that the robots in a synchronized manner, particularly simultaneously, reach at least predetermined synchronization positions on their respective predetermined paths or path sections, these synchronization positions being adjacent to the deployment positions in the direction of movement or sense of movement when they jointly start in their (synchronized) deployment positions and move along their predetermined paths, particularly when their respective predetermined paths or path sections starting out from their synchronized deployment positions are geometrically coupled.

In a further development, at least one synchronized further deployment position on the other path will be moved into. In this manner, the predetermined further path can be used advantageously. In a further development, at least one synchronized further deployment position will be moved into on a linear path in the work space or the joint coordinate space.

In this manner, the synchronized further deployment position can be advantageously moved into along the shortest path.

Accordingly, in an exemplary embodiment n the system incorporates the means to determine, synchronized to the deployment position of the first robot, a further deployment position for at least one further robot on its further path, and the means to move into these further deployment position(s) with the further robot(s), particularly on the further path (s) or on (a) linear path (s) in the work space or joint coordinate space.

A means within the sense of the present invention can be technically developed by hardware and/or software, in particular a, preferably with a memory and/or bus system, data-connected or signal-connected, in particular digital, processing unit, in particular microprocessor unit (CPU) and/or have one or more programs or program modules. The CPU can be developed to process commands that are implemented as a program stored in a storage system, to acquire data signals from a data bus and/or to send output signals to a data bus. A storage system can have one or several, in particular various storage media, in particular optical, magnetic, solid state media and/or other non-volatile media. The program can be designed in such a way that it embodies the methods described here or is capable of executing them, so that the CPU can execute the steps of such methods and thereby in particular design and/or operate the robot, and in particular control the robot or the robot setup.

In an exemplary embodiment, one or more steps of a method described herein is/are performed in a partly or fully automated way.

BRIEF DESCRIPTION OF THE DRAWINGS

Other advantages and features arise from the subclaims and the exemplary embodiment examples. For this purpose, the following partly schematic figures show:

DETAILED DESCRIPTION

Figure 1:
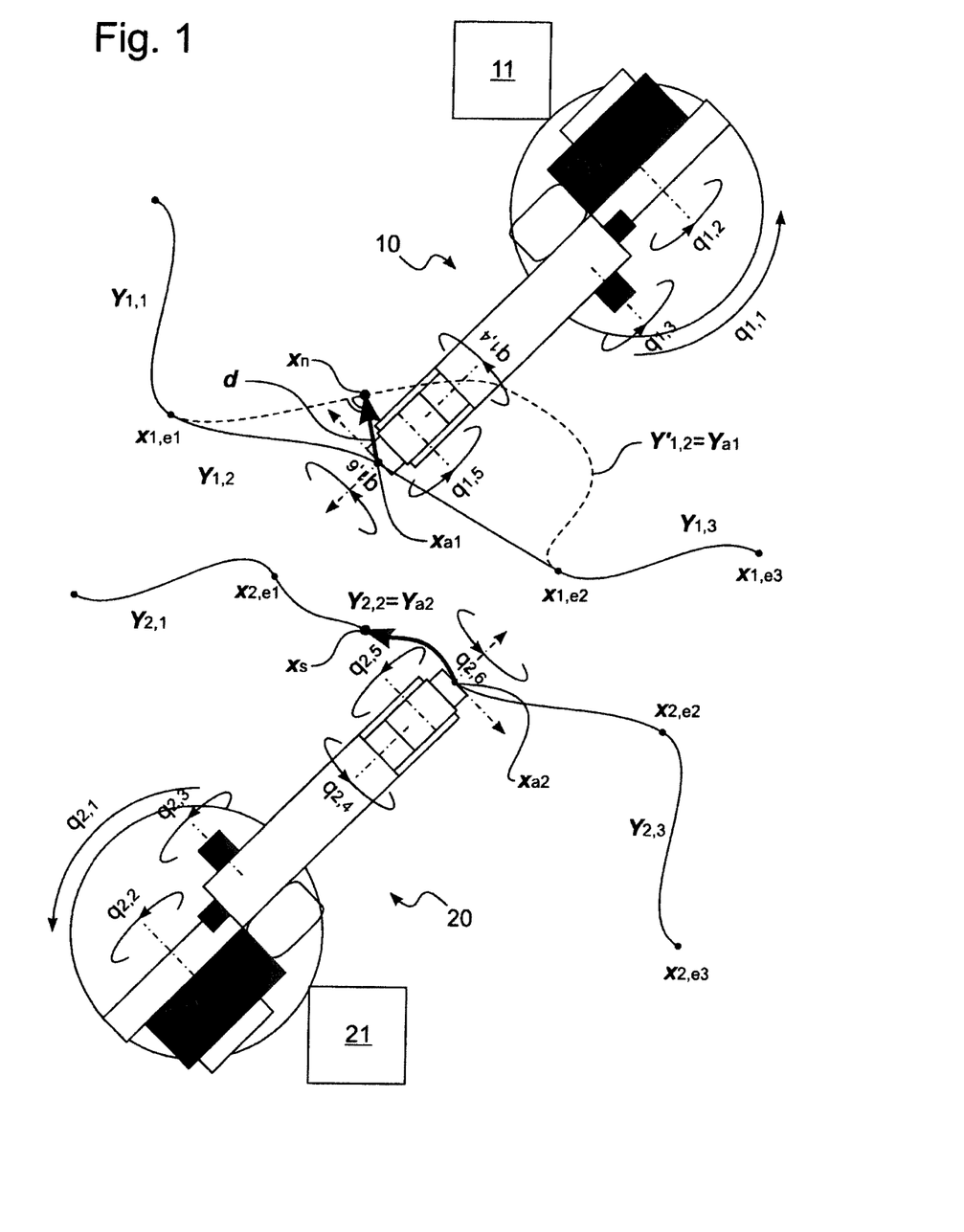
FIG. 1 depicts the movement of a robot setup along a path group according to an exemplary embodiment of the present invention.

FIG. 1 shows the movement of a predetermined robot setup along a path group according to an exemplary embodiment of the present invention.

By way of example, the robot setup comprises a first robot 10 having a controller 11 and a further robot 20 with a controller 21, which together form a system for implementing a method for the synchronized movement along the path group by the two robots 10, 20 according to an exemplary embodiment n of the present invention.

By way of example, the robots 10, 20 features six axes of motion (rotation), whose positions are described by the joint coordinates $q_1, \ldots, q_{1,6}$ or $q_{2,1}, \ldots, p_{2,6}$. These joint coordinates or the three-dimensional position and orientation of a TCP indicated by a dot-dash line in FIG. 1 are, or rather describe, coordinates or positions x of the respective robot.

A path for the first robot 10 is predefined or rather stored in its controller 11, whereby the path comprises successive path sections $Y_{1,1}, \ldots, Y_{1,3}$. Each of these path sections is predefined particularly by a corresponding command set of a control program stored in the controller 11, and has an end position or target position $x_{1,e1}, x_{1,e2}$ or $x_{1,e3}$.

Analogously, a path for the further robot 20 is predefined or rather stored in its controller 21, whereby the path comprises successive path sections $Y_{2,1}, \ldots, Y_{2,3}$. Analogously, each of these path sections is predefined by a corresponding command set of a control program stored in the controller 21, and has an end position or target position $x_{2,e1}, x_{2,e2}$ or $x_{2,e3}$.

The predefined paths $\{Y_{1,1}, \ldots, Y_{1,3}\}, \{Y_{2,1}, \ldots, Y_{2,3}\}$. are traversed synchronized in such a way that the robots 10, 20 simultaneously reach the end positions of the respective path sections. In other words, in the example exemplary embodiment, the end positions are generically selected as synchronized/synchronization positions.

By way of example, the movement along the path sections was interrupted and the saved path section $Y_{1,2}$, just traversed by robot 10, was modified to a new path section $Y'_{1,2}$, which is indicated by dashed lines in FIG. 1 and now represents the (new) current path section $Y_{a1}$ of the first robot 10, which was predetermined by a manually given or user-commanded modification of the stored path section $Y_{1,2}$ of the predetermined path $\{Y_{1,1}, \ldots, Y_{1,3}\}$.

The current path section $Y_{a2}$ of the second robot 20 is the (unchanged) saved path section $Y_{2,2}$.

Due to this modification, the current position $X_{a1}$ of the first robot 10 is no longer on this current path section $Y_{a1}$.

An analogous situation could result from an operator commanding a jump of the set pointer in the control program of the first robot 10 or by manually controlling the first robot 10 to move to another position.

Figure 2:
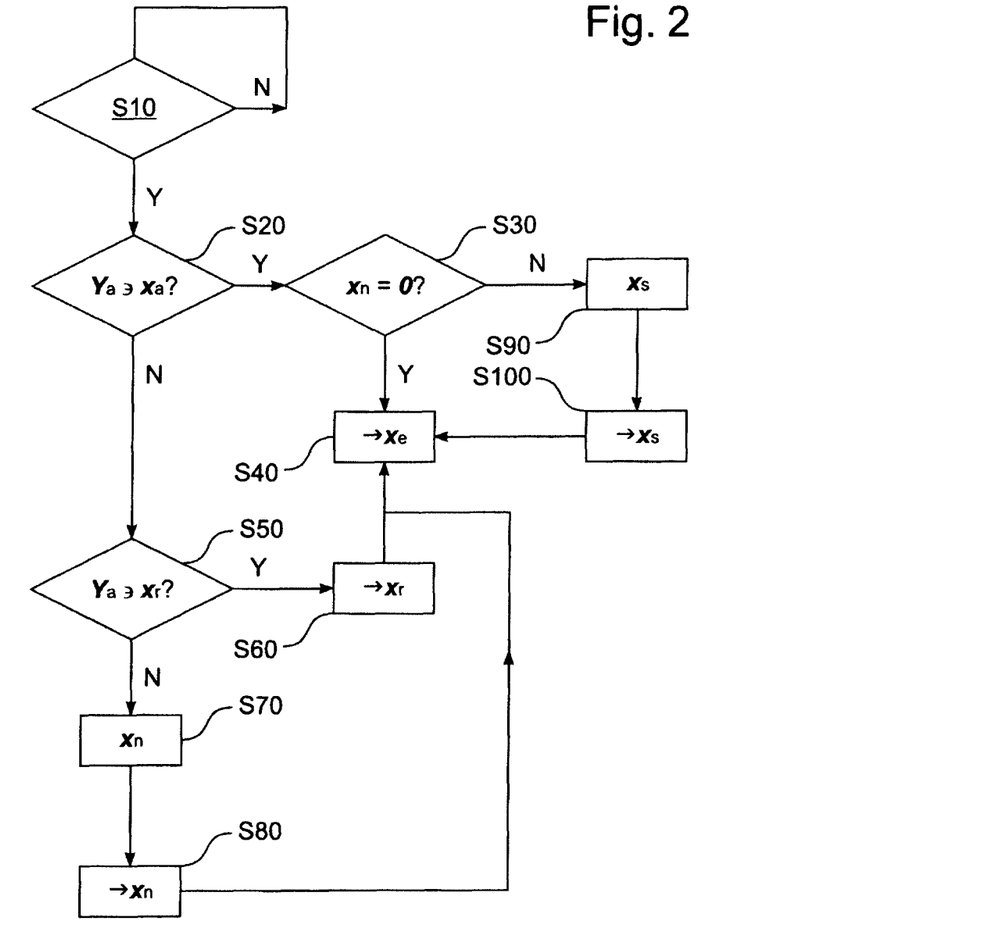
FIG. 2 depicts the execution of this method.

With reference to FIG. 2, a method performed by the system 11, 21 in accordance with an exemplary embodiment of the present invention will now be explained in more detail. For this purpose, the system 11, 21 is equipped with correspondingly set up software and/or hardware means.

In a first step S10, it is determined whether an interruption of the movement of the path group has occurred or not. If there is no interruption (S10: "N"), the system or method repeats step S10.

If there is an interruption (S10: "Y"), the system or method proceeds to step S20.

In this step it checks whether a current position $x_a$ of the respective robot is still on the current path section $Y_a$ or not, by determining whether there is a deviation of the current position of the robot from the current path section, and checks whether this deviation is below a first limit value.

As explained above with reference to FIG. 1, this is not the case for the first robot 10 (S20: "N"), so that the system or method proceeds to step S50.

In this step it checks whether, when the interruption of the movement of the path group occurred, a stored return position $x_r$, which in the exemplary embodiment example due to the modification of the path section respectively corresponds to the current position $x_a$, is still on the current path section $Y_a$ or not, by determining whether there is a deviation of the saved return position of the robot from the current path section, and checks whether it is less than a second limit value.

As explained above with reference to FIG. 1, this is also not the case for the first robot 10 (S50: "N"), so that the system or method proceeds to step S70.

In this step, the system or the method determines for the first robot 10 a deployment position $x_n$ on the current path section $Y_{a1}$ of the predetermined path for which the distance parameter d, which is determined on the basis of a distance of the current position $x_{ai}$ of the first robot 10 to the current path section $Y_{a1}$, is minimal and thus smaller than the partial area $x_n$ of the current path section $Y_{a1} \setminus x_n$ that is complementary to the deployment position $Y_{a1}$.

In the exemplary embodiment example, the distance parameter d, which in an exemplary embodiment is weighted by component, is the vector quantity d from the current position $x_{ai}$ to the current path section $Y_{a1}$, which is perpendicular to the current path section $Y_{a1}$, as indicated in FIG. 1.

It should again be noted that the position x respectively describes the position and orientation of the TCP in six dimensions, so that for example the position can be in the joint angle space or axis space. Accordingly, d can be calculated particularly with $d=\sqrt{(d_1^2+d_2^2+d_3^2+d_4^2+d_5^2+d_6^2)}$ whereby $d_1, \ldots, d_6$ represent the components of the vector d in the joint angle space or axis space.

In the same manner, position x can, again purely by example, also encompass the three position coordinates, x, y, z, and the skew-symmetric part of the transformation matrix between the TPC and an environment-fixed base coordinate system, which describes the orientation of the TPC. Accordingly, the vector d can also be represented in the work space.

The deployment position $x_n$ can particularly also be found, or rather defined, by means of a hypersphere—where appropriate, deformed by weighting factors or scaled in coordinate directions—around the current position in a common space, in which the path is predetermined or in which it is transformed, and in which the current position is known or has been determined, which is continuously enlarged until it contacts the path for the first time, whereby the contact point is then the deployment position $x_n$.

This is followed by a step S80, in which a first robot 10 moves along a linear path in the work space or joint coordinate space and moves into the deployment position $x_n$, as soon as it, or rather the robot setup, receives a corresponding start command.

In a step S40, the first robot 10 is then driven from the deployment position to the end position $x_{1,e2}$ of the current path section $Y_{a1}$ on the current path section $Y_{a1}$.

On the other hand, if the test in step S50 indicates that the return position $x_r$, which was stored at the interruption of the movement along the path group, is still lying on the respective path section $Y_a$ (S50: "Y") because the deviation of the stored return position of the current path section is less than the second limit value, for example, because the first robot 10 was only manually moved along the unaltered path section $Y_{1,2}$ from its stored return position $x_r$ to its current position $x_a$, then, in a step S60, this return position $x_r$ is moved into by the robot along a linear path in the work space or joint coordinate space.

In step S40, the robot is then moved from the return position $x_r$ to the end position $x_e$ of the current path section on the current path section.

If the test in step S20 shows that the current position $x_a$ is still on the current path section $Y_a$ (S20: "Y"), then the system or the method continues with step S30.

As explained above with reference to FIG. 1, for the second robot 20, this is the case (S20: "Y").

In step S30, the system or method checks whether a deployment position $x_n$ has been determined for another robot of the robot setup.

As explained above, this is the case with respect to the other robot 20, because the deployment position $x_n$ has been determined for the first robot 10.

Accordingly (S30: "N"), the system or method continues with step S90.

In this step, for the second robot 20 it determines a further deployment position $x_s$ for the further robot 20 on the further path $\{Y_{2,1}, \ldots Y_{2,3}\}$, this further deployment position being synchronized to the deployment position $x_n$ of the first robot. This deployment position is determined such that the first robot 10, starting from its deployment position $x_n$ on its path $\{Y_{1,1}, Y'_{1,2}, Y_{2,3}\}$ and the second robot 20, starting from its other deployment position $x_s$, move along the further path $\{Y_{2,1}, \ldots Y_{2,3}\}$, and reach the respective next synchronization points $x_{1,e2}, x_{2,e2}$, at the same time.

Subsequently, in a step S100, the further robot on its further path $\{Y_{2,1}, \ldots Y_{2,3}\}$ moves into this further deployment position $x_s$, as indicated in FIG. 1.

From there, in a next step S40, the next end position is moved into, whereby in the example exemplary embodiment the end position and the synchronization position coincide for a more compact representation.

If in step S30 the system or the method detects that no deployment position $x_{en}$ has been determined for any other robots of the robot arrangement (S30: "N"), then the next position is moved into directly in step S40.

Although the preceding description explains exemplary embodiments, it should be noted that a large number of variations are possible.

Thus, the method was explained by example for two synchronized robot 10, 20.

If it is now performed for a single robot, for example, the first robot 10, then steps S30, S90 and S100 can be eliminated, or rather the next end position can be moved into directly if it is determined that the current position is still on the current path section (S20: "Y").

In addition, or alternatively, step S50 can also be eliminated, i.e. if there is a deviation between the current position of the current path section, then a deployment position can be determined and moved into—where applicable, only after a (further) start command has been received.

It should also be noted that the exemplary embodiments are mere examples only, and in no way at all do they limit the scope of protection, the applications and the structure. Rather, the specialist will find in the preceding description a guide for establishing at least one exemplary embodiment, whereby various changes, particularly with respect to the function and arrangement of the described components may be made without departing from the scope of protection as derived from the claims and these equivalent feature combinations.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS 10 (first) robot
11 Controller (system)
20 further robot
21 Controller (system)
$q_{ij}$ Joint coordinates (i=1, 2; j=1 , . . . , 3)
$x_{a(1)}$,
$x_{a2}$ current position
$x_{i,ej}$ End position/Synchronization position (i=1, 2; j=1 , . . . , 3)
$Y_{ij}$ Path section (i=1, 2; j=1 , . . . , 3)
$x_n$ Deployment position
$x_s$ synchronized further deployment position
$Y_{a(1)}$,
$Y_{a2}$ current path section

What is claimed is:

1. A method for moving along a predetermined path with a robot in an at least a partially automated manner, the method comprising:
determining with a controller a deployment position on a current path section of the predetermined path for which a distance parameter satisfies a predetermined condition, wherein the distance parameter is defined on the basis of the distance of a current position of the robot relative to the current path section;
wherein the current path section is a stored path section of the predetermined path; and
the robot moving into the deployment position.

2. The method of claim 1, wherein at least one of:
the distance parameter satisfies the condition when the value of the distance parameter is less than or equal to the values of the distance parameters of all positions in a partial area of the current path section; or
moving into the deployment position comprises moving the robot if a deployment condition is satisfied.

3. The method of claim 2, wherein the partial area of the current path section is complementary to the deployment position.

4. The method of to claim 1, wherein the deployment condition comprises a deviation of the current position of the robot from the current path section.

5. The method of claim 1, wherein the deployment condition comprises a deviation of a stored return position of the robot from the current path section.

6. The method of claim 5, wherein the deployment condition comprises a deviation of a return position that is stored upon an interruption of the movement along the predetermined path.

7. The method of claim 1, further comprising:
modifying the stored path section of the predetermined path before determining the deployment position.

8. The method of claim 7, wherein the stored path section is-modified by substitution of the stored path section with a different stored path section.

9. The method of claim 1, further comprising;
predetermining the current path section by jumping to a stored path section of the predetermined path.

10. The method of claim 1, further comprising:
moving to the deployment position on a linear path in a work space or a joint coordinate space.

11. The method of claim 1, further comprising:
moving the robot on the current path section from the deployment position to an end position of the current path section.

12. A method for at least partially automated synchronized movement along a predetermined path group with at least two robots, the method comprising:
moving a first robot along a predetermined first path of the path group according to the method of claim 1; and
moving a second robot along least one second predetermined path of the path group in synchronization with the movement of the first robot.

13. The method of claim 12, further comprising:
synchronizing a second deployment position of the second robot on the second predetermined path with the deployment position of the first robot; and
moving the second robot into the second deployment position.

14. The method of claim 13, wherein moving the second robot into the second deployment position comprises moving the second robot on the second path or on a linear path in a work space or a joint coordinate space.

15. A system for at least partially automated movement along a predetermined path with a robot, the system comprising:
means for determining a deployment position on a current path section of the predetermined path for which a distance parameter satisfies a predetermined condition, wherein the distance parameter is defined on the basis of a distance of a current position of the robot relative to the current path section;
wherein the current path section is a stored path section of the predetermined path; and
means for moving the robot into the deployment position, in particular insofar as a deployment condition is satisfied.

16. The system of claim 15, wherein at least one of:
the distance parameter satisfies the condition when the value of the distance parameter is less than or equal to the values of the distance parameters of all positions in a partial area of the current path section; or
moving into the deployment position comprises moving the robot if a deployment condition is satisfied.

17. The system of claim 16, wherein the partial area of the current path section is complementary to the deployment position.

18. A system for at least partially automated synchronized movement along a predetermined path group with at least two robots, the system comprising:
a system according to claim 15 for movement of a first one of the robots along a predetermined first path of the path group; and
means for synchronized movement of a second one of the robots along at least one second predetermined path of the path group.

19. A computer program product for moving along a predetermined path with a robot in an at least a partially automated manner, the computer program product having program code stored on a non-transitory computer-readable medium, the program code configured, when run on a robot controller, to cause the robot controller to:

determine a deployment position on a current path section of the predetermined path for which a distance parameter that is defined on the basis of the distance of a current position of the robot relative to the current path section satisfies a predetermined condition;

wherein the current path section is a stored path section of the predetermined path; and move the robot into the deployment position.

* * * * *